(12) United States Patent
Widener

(10) Patent No.: US 7,546,735 B2
(45) Date of Patent: Jun. 16, 2009

(54) LOW-COST DUAL-FUEL COMBUSTOR AND RELATED METHOD

(75) Inventor: Stanley Kevin Widener, Greenville, SC (US)

(73) Assignee: General Electric Company, Schenectady, NY (US)

( * ) Notice: Subject to any disclaimer, the term of this patent is extended or adjusted under 35 U.S.C. 154(b) by 611 days.

(21) Appl. No.: 10/963,724

(22) Filed: Oct. 14, 2004

(65) Prior Publication Data

US 2006/0080966 A1    Apr. 20, 2006

(51) Int. Cl.
*F02C 1/00* (2006.01)
*F02G 3/00* (2006.01)

(52) U.S. Cl. .......................................... 60/746; 60/737
(58) Field of Classification Search ............... 60/776, 60/737, 746, 39.463
See application file for complete search history.

(56) References Cited

U.S. PATENT DOCUMENTS

| | | | |
|---|---|---|---|
| 4,292,801 A * | 10/1981 | Wilkes et al. ................. | 60/776 |
| 5,199,265 A | 4/1993 | Borkowicz | |
| 5,259,184 A | 11/1993 | Borkowicz et al. | |
| 5,274,991 A | 1/1994 | Fitts | |
| 5,303,542 A * | 4/1994 | Hoffa ........................... | 60/773 |
| 5,359,847 A * | 11/1994 | Pillsbury et al. ........... | 60/39.463 |
| 5,713,205 A | 2/1998 | Sciocchetti et al. | |
| 5,722,230 A | 3/1998 | Cohen et al. | |
| 5,729,968 A * | 3/1998 | Cohen et al. ................. | 60/39.6 |
| 6,397,602 B2 * | 6/2002 | Vandervort et al. ........... | 60/737 |
| 6,598,383 B1 * | 7/2003 | Vandervort et al. ........... | 60/773 |
| 6,915,636 B2 * | 7/2005 | Stuttaford et al. ............. | 60/737 |
| 2005/0210880 A1 * | 9/2005 | Inoue et al. .................... | 60/776 |
| 2005/0268617 A1 * | 12/2005 | Amond et al. ................. | 60/776 |
| 2006/0080966 A1 * | 4/2006 | Widener ....................... | 60/775 |
| 2006/0191268 A1 * | 8/2006 | Widener et al. ............... | 60/772 |

* cited by examiner

*Primary Examiner*—William H Rodríguez
(74) *Attorney, Agent, or Firm*—Nixon & Vanderhye, P.C.

(57) ABSTRACT

A combustor for a gas turbine includes a combustion chamber and a plurality of radially outer nozzles surrounding a single, center nozzle, the radially outer nozzles configured to supply only gas fuel to the combustion chamber and the center nozzle configured to supply both gas and liquid fuel to the combustion chamber.

9 Claims, 5 Drawing Sheets

LOW-COST DUAL-FUEL COMBUSTOR AND RELATED METHOD

BACKGROUND OF THE INVENTION

This invention relates generally to gas turbine machinery and specifically, to a multi-nozzle, dual-fuel can combustor with a center nozzle surrounded by outer nozzles for use in land-based power generation gas turbines.

Gas turbines generally include a compressor, one or more combustors, a fuel injection system and a multi-stage turbine section. Typically, the compressor pressurizes inlet air which is then turned in direction or reverse-flowed to the combustors where it is used to cool the combustors and also to provide air to the combustion process. In some multi-combustor turbines, the combustors themselves are located in a circular array about the turbine rotor, in what is generally referred to as a "can-annular" array, and transition ducts deliver combustion gases from each of the combustors to the first stage of the turbine section.

More specifically, in a typical gas turbine configuration, each combustor includes a generally cylindrical combustor casing secured to the turbine casing. Each combustor also includes an internal flow sleeve and a combustor liner substantially concentrically arranged within the flow sleeve. Both the flow sleeve and combustor liner extend between a double-walled transition duct at their downstream ends, and a combustor liner cap assembly at their upstream ends. The outer wall of the transition duct and a portion of the flow sleeve are provided with air supply holes over a substantial portion of their respective surfaces, thereby permitting compressor air to enter the radial space between the inner and outer walls of the transition piece and between the combustor liner and the flow sleeve, and to be reverse-flowed to the upstream portion of the combustor where the airflow is again reversed to flow through the cap and into the combustor.

Dry low NOx (DLN) gas turbines typically utilize dual-fuel combustors that have both liquid and gas fuel capability. One common arrangement includes four dual-fuel nozzles surrounding a center dual-fuel nozzle. The combined capability for flowing liquid fuel, atomizing air, dilution water, diffusion gas, premixed gas, and sometimes air curtain/purge air, however, makes the nozzles complex and expensive, and requires a large amount of space in the premixer for the many separate fluid passages. Further, when scaling these nozzle designs to smaller machines, the space requirement of the many passages becomes increasingly difficult to manage.

Commonly owned U.S. Pat. No. 6,598,383 discloses an arrangement with a gas-only center nozzle surrounded by a plurality of outer dual-fuel nozzles. With this configuration, ignition is with diffusion fuel in the center nozzle only, and the lack of a close spark may make ignition problematic.

BRIEF DESCRIPTION OF THE INVENTION

This invention provides a simplified multi-nozzle dual-fuel "can-annular" combustor with a center nozzle surrounded by four or more radially outer nozzles. The center nozzle is a dual-fuel nozzle that has the capability of flowing premix gas fuel and diffusion liquid fuel. The outer nozzles are gas-only nozzles, and have the capability of flowing only premix gas fuel and diffusion gas fuel. With this arrangement, the total number of fuel passages in the nozzles is significantly reduced, and the operational combustor fueling modes are simplified to include the following: a gas-fuel diffusion mode in which only the outer, gas-only nozzles are fueled; a piloted premix mode in which the outer nozzles are supplied with diffusion gas and all nozzles are supplied with premix gas; a premix mode in which all nozzles are supplied with premix gas only; and a liquid fuel mode in which the center nozzle is supplied with liquid fuel.

In addition, with the gas-only nozzles in the radially outer location, and thus closer to the ignition source (sparkplug), ignition will be easier to achieve in the gas-only mode.

Accordingly, in its broader aspects, the invention relates to a combustor for a gas turbine comprising a combustion chamber and a plurality of radially outer nozzles surrounding a single, center nozzle, the radially outer nozzles configured to supply only gas fuel to the combustion chamber and the center nozzle configured to supply both gas and liquid fuel to the combustion chamber.

In another aspect, the invention relates to a combustor for a gas turbine comprising a plurality of gas-only radially outer nozzles surrounding a single, dual-fuel center nozzle; wherein the plurality of radially outer nozzles comprises four radially outer nozzles at substantially ninety degree intervals; wherein each gas-only radially outer nozzle is formed with passages adapted to supply only diffusion gas and premix gas; and wherein the center dual-fuel nozzle is formed with passages adapted to supply premix gas fuel and diffusion liquid fuel to the combustion chamber.

In still another aspect, the invention relates to a method of operating low NOx combustors in a gas turbine wherein the combustors each include a plurality of radially outer nozzles surrounding a single center nozzle comprising operating the combustors in a first diffusion mode where only the radially outer nozzles are fueled; operating the combustors in a second piloted premix mode where the radially outer nozzles are supplied with diffusion gas and the radially outer nozzle and the center nozzle are supplied with premix gas; operating the combustors in a third premix mode where the radially outer nozzles and the center nozzle are supplied with only premix gas; and operating the combustors in a fourth liquid fuel mode where the center nozzle is supplied with liquid fuel.

The invention will now be described in detail in connection with the drawings identified below.

DETAILED DESCRIPTION OF THE INVENTION

Figure 1:
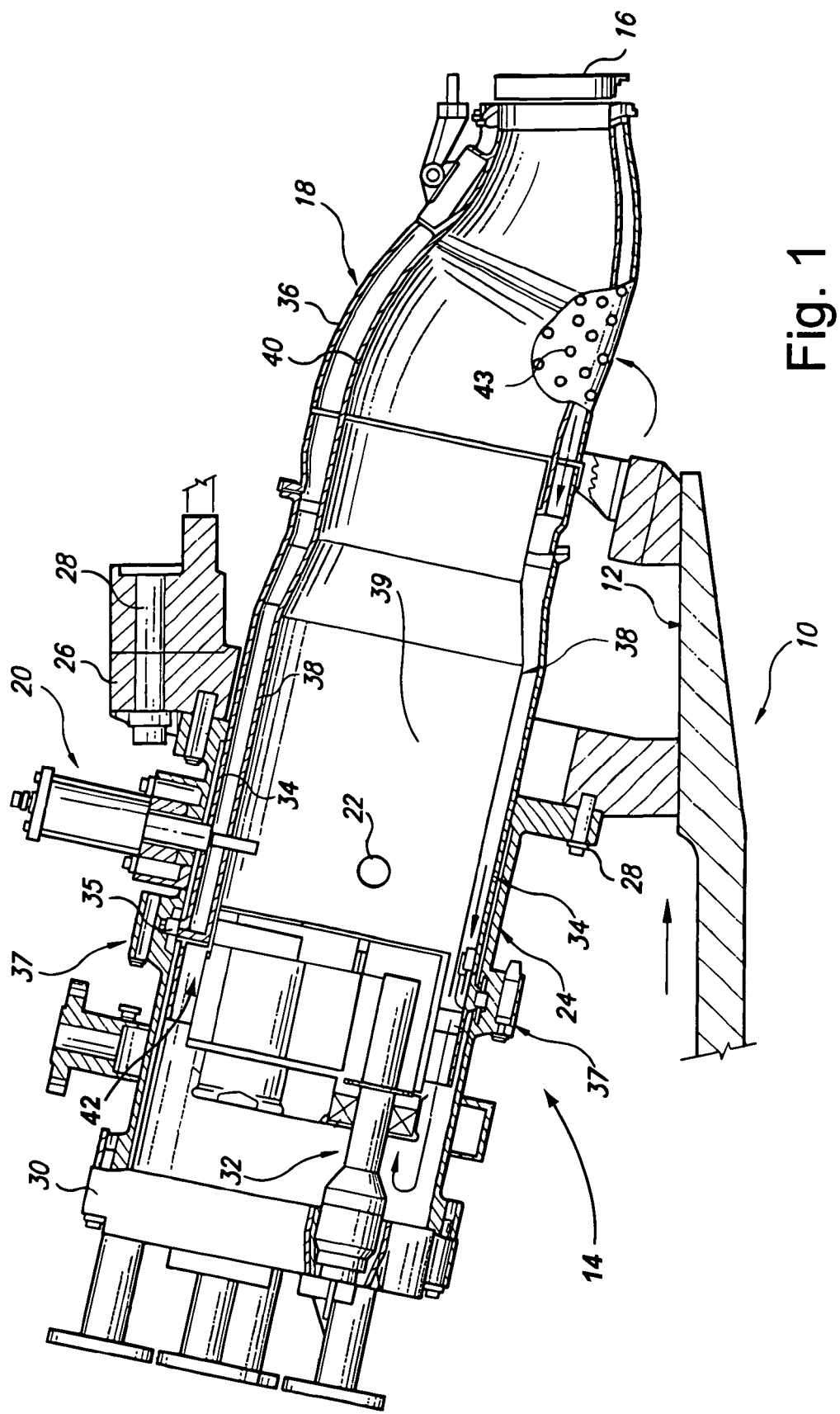
FIG. 1 is a partial cross-section of a known gas turbine combustor.

The gas turbine 10 (partially shown) includes a compressor 12 (also partially shown), a plurality of combustors 14 (one shown), and a turbine section represented here by a single blade 16. Although not specifically shown, the turbine is drivingly connected to the compressor 12 along a common axis. The compressor 12 pressurizes inlet air which is then reverse flowed to the combustor 14 where it is used to cool the combustor and to provide air to the combustion process.

As noted above, a plurality of combustors 14 are located in an annular array about the axis of the gas turbine. A double-walled transition duct 18 connects the outlet end of each combustor with the inlet end of the turbine to deliver the hot products of combustion to the turbine. Ignition is achieved in the various combustors 14 by means of sparkplug 20 in conjunction with crossfire tubes 22 (one shown) in the usual manner.

Each combustor 14 includes a substantially cylindrical combustor casing 24 which is secured at an open forward end to the turbine casing 26 by means of bolts 28. The rearward or proximal end of the combustor casing is closed by an end cover assembly 30 which includes supply tubes, manifolds and associated valves for feeding gaseous fuel, liquid fuel, air and water to the combustor as described in greater detail below. The end cover assembly 30 receives a plurality (for example, three to six) "outer" fuel nozzle assemblies 32 (only one shown in FIG. 1 for purposes of convenience and clarity), arranged in a circular array about a longitudinal axis of the combustor, and one center nozzle.

Within the combustor casing 24, there is mounted, in substantially concentric relation thereto, a substantially cylindrical flow sleeve 34 which connects at its forward end to the outer wall 36 of the double walled transition duct 18. The flow sleeve 34 is connected at its rearward end by means of a radial flange 35 to the combustor casing 24 at a butt joint 37 where fore and aft sections of the combustor casing 24 are joined.

Within the flow sleeve 34, there is a concentrically arranged combustor liner 38 defining a combustion chamber 39 ad which is connected at its forward end with the inner wall 40 of the transition duct 18. The rearward end of the combustor liner 38 is supported by a combustor liner cap assembly 42 which is, in turn, supported within the combustor casing 24 by a plurality of struts and an associated mounting assembly (not shown in detail).

The outer wall 36 of the transition duct 18 may be provided with an array of apertures 43 to permit air to reverse flow from the compressor 12 through the apertures 43 and into the annular space between the flow sleeve 34 and combustor liner 38 toward the upstream end of the combustor (as indicated by the flow arrows in FIG. 1). This is a well known arrangement that needs no further discussion.

Figure 2:
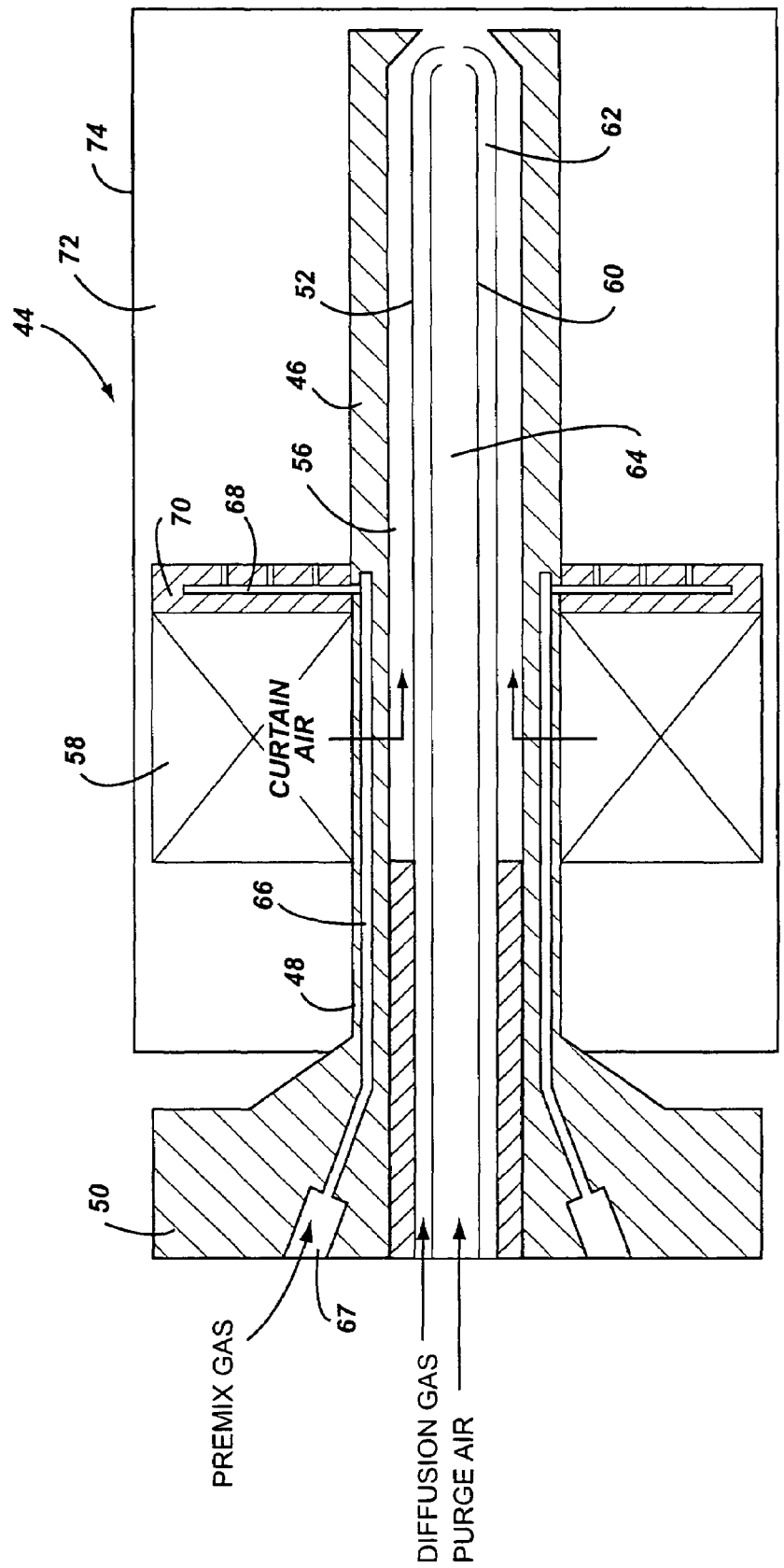
FIG. 2 is a simplified and partially schematic cross-section of a known gas turbine gas-only nozzle for use with the present invention.

Turning to FIG. 2, a conventional gas-only nozzle 44 may be used in the group of radially outer nozzles surrounding the single center nozzle in accordance with an exemplary embodiment of this invention. The nozzle 44 includes an outer tube 46 that may be formed at a rearward end 48 with a flange 50 enabling attachment to an end cover assembly, as at 30 in FIG. 1. Alternatively, the flange 50 could be incorporated as part of the end cover assembly. It will be appreciated that the manner in which the various passages are provided in the nozzle, and the mounting arrangements for the various tubes within the nozzle are, for purposes of this invention, considered to be within the skill of the art. A first inner tube 52 is arranged concentrically within the outer tube 46, creating an annular curtain air supply (or first) passage 56, with compressor air entering the passage 56 through tube 46 via circumferentially arranged holes (not shown) in tube 46 and passages (also not shown) in the fixed vanes of swirler 58.

A second radially inner tube 60 extends through the center of the nozzle, concentrically within the first radially inner tube 52. This arrangement creates an annular diffusion gas (or second) passage 62 between the first and second radially inner tubes. The diffusion gas is supplied through bosses/flanges and distributing tubes on the end cover assembly. The second radially inner tube (or center tube) 60 itself defines a purge air passage 64, with the air also supplied via hardware at the end cover assembly.

A premix (or third) radially inner passage 66 lies within the tube 46, the forward end of which terminates adjacent the forward edge of swirler 58. A second premix passage (not shown) may be formed radially between passages 56 and 66. Premix gas enters the nozzle through cored holes 67 in the flange 50 and exits through holes 68 in the sides of the vanes 70 into the annulus 72 of the burner tube 74 where it premixes and then enters the combustion zone. Diffusion gas and curtain air mix via holes cross-drilled in the tip of tube 52.

Figure 3:
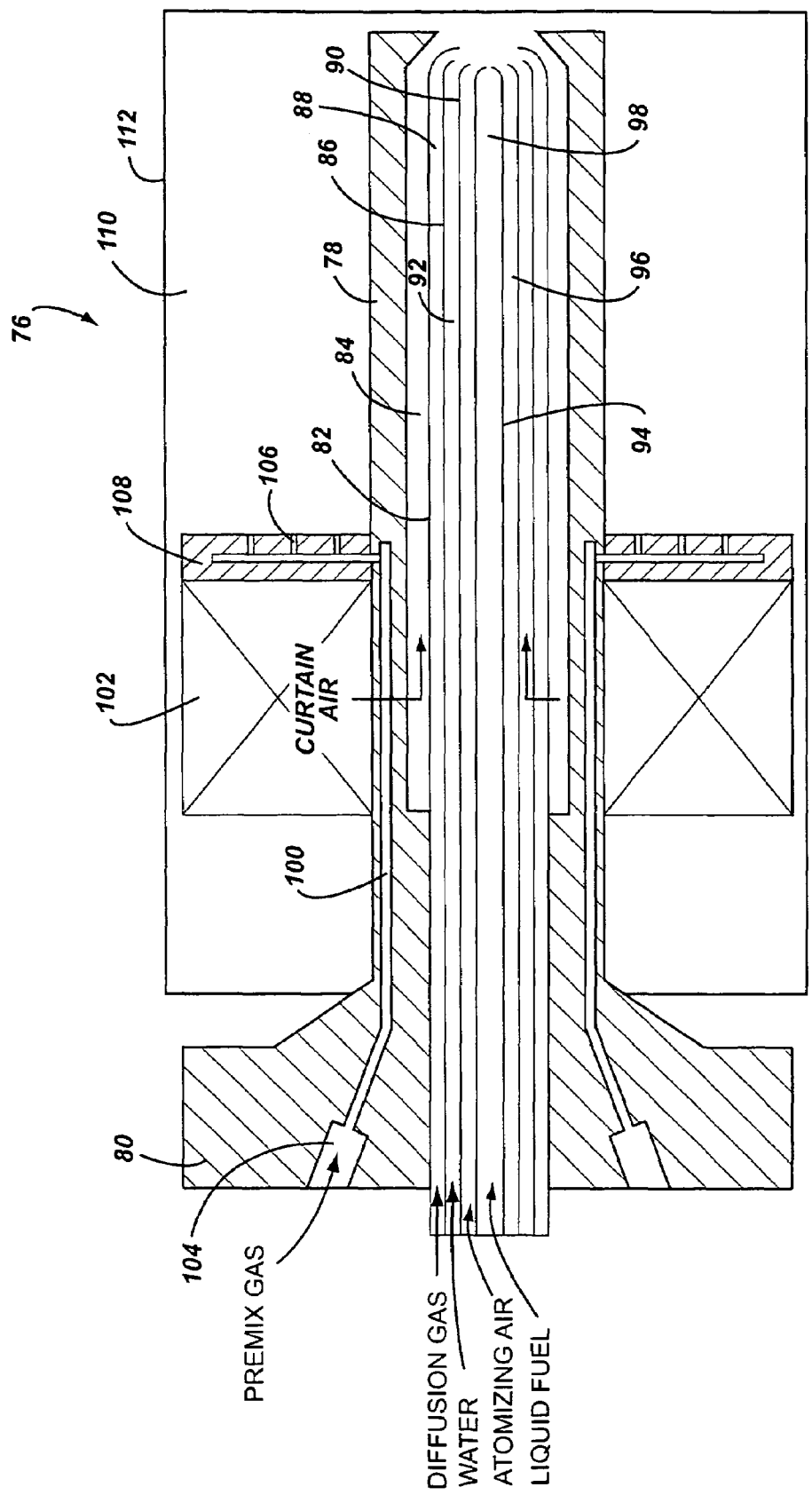
FIG. 3 is a simplified and partially schematic cross-section of a known gas turbine dual-fuel nozzle.

FIG. 3 illustrates a dual-fuel nozzle 76, also of known construction. The overall configuration of the nozzle may be generally similar to the nozzle shown in FIG. 2 but with additional passages that enable the nozzle to function as a dual-fuel nozzle. Thus, the nozzle 76 includes an outer tube 78 with a flange 80 at its rearward or upstream end that may be incorporated into an end cover assembly. A first inner tube 82, arranged concentrically within the outer tube 78 establishes an annular curtain air passage 84, with compressor air entering the passage in the same manner as described above in connection with the nozzle shown in FIG. 2.

A second inner tube 86, arranged concentrically within tube 82 creates an annular diffusion gas passage 88. A third inner tube 90 arranged concentrically within the tube 86 creates an annular water passage 92. A center tube 94 creates an annular atomizing air passage 96 while the center tube 94 itself serves as the liquid fuel passage 98. Here again, the various tubes are secured in an end cover assembly and are supplied with the appropriate fuel or other fluid (i.e., air or water) in an otherwise conventional fashion.

A premix gas passage 100 is formed within the tube 78 and terminates adjacent the swirler 102 (a second premix passage (not shown) may be provided between passages 84 and 100). As in the nozzle 44 shown in FIG. 2, the premix gas may be supplied through cored holes 104 in the flange (or end cover) 80 into the passage 100, to exit through holes 106 in the sides of vanes 108 into the annulus 110 of the burner tube 112.

Figure 4:
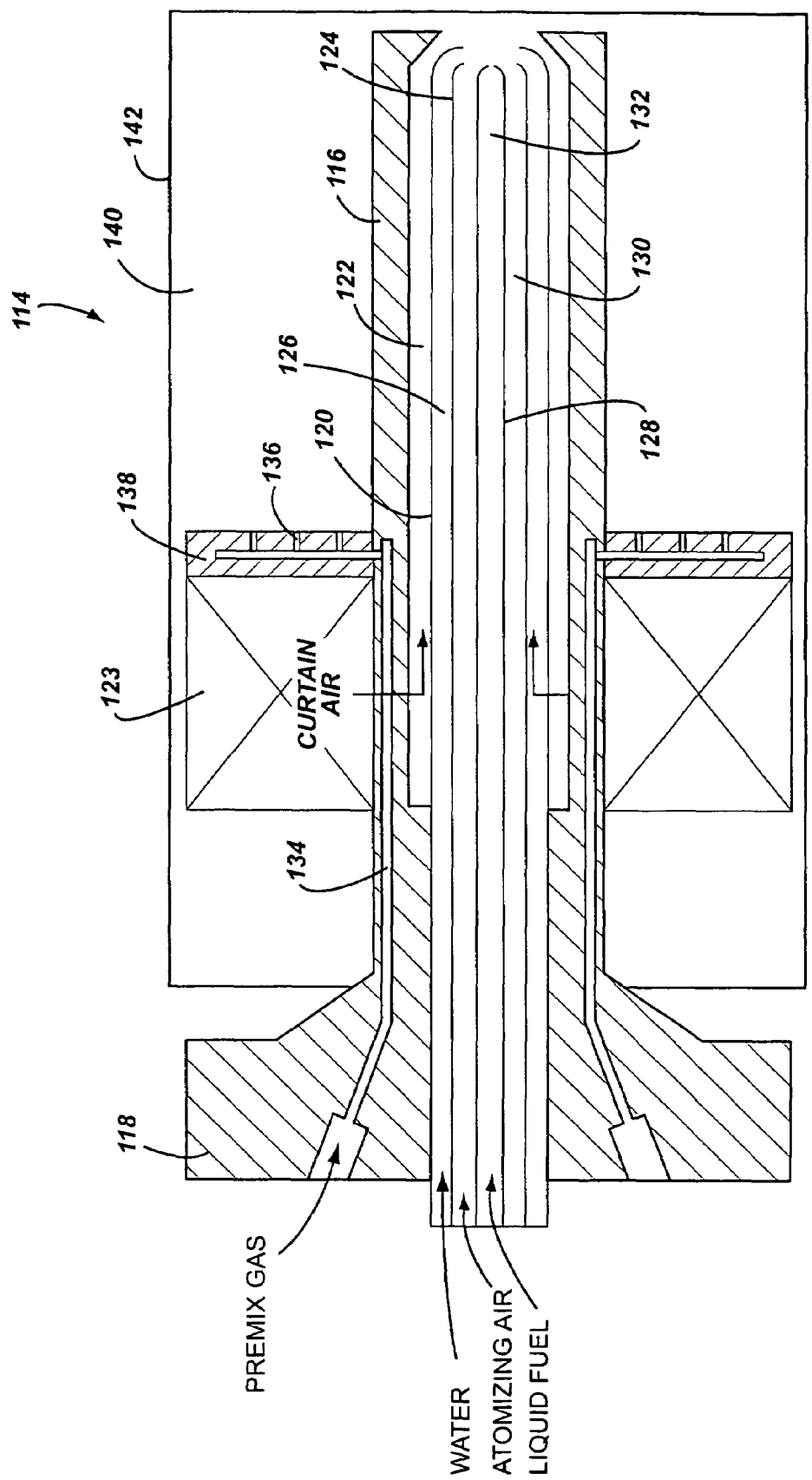
FIG. 4 is a simplified and partially schematic cross-section of a modified dual-fuel nozzle for use with the present invention.

FIG. 4 illustrates a modified dual-fuel nozzle 114 in accordance with the exemplary embodiment of the invention. Of significance is the elimination of the diffusion gas passage 88 in FIG. 3. Thus, the modified nozzle 114 includes an outer tube 116 with a flange 118 at its rearward or upstream end that may be incorporated into an end cover assembly. A first inner tube 120, arranged concentrically within the outer tube 116 establishes an annular curtain air passage 122, with compressor air entering the passage in the same manner as described above in connection with the nozzle shown in FIG. 2, via swirler 123.

A second inner tube 124, arranged concentrically within tube 120 creates an annular water passage 126. A center tube 128 creates an annular atomizing air passage 130 while the center tube 128 itself serves as the liquid fuel passage 132. Here again, the various tubes are secured in an end cover assembly and are supplied with the appropriate fuel or other fluid (i.e., air or water) in an otherwise conventional fashion.

A premix gas passage 134 is formed within the tube 120 and may otherwise be identical to the premix passage 100 in FIG. 3, with the premix air exiting through holes 136 in the sides of vanes 138 into the annulus 140 of the burner tube 142.

Figure 5:
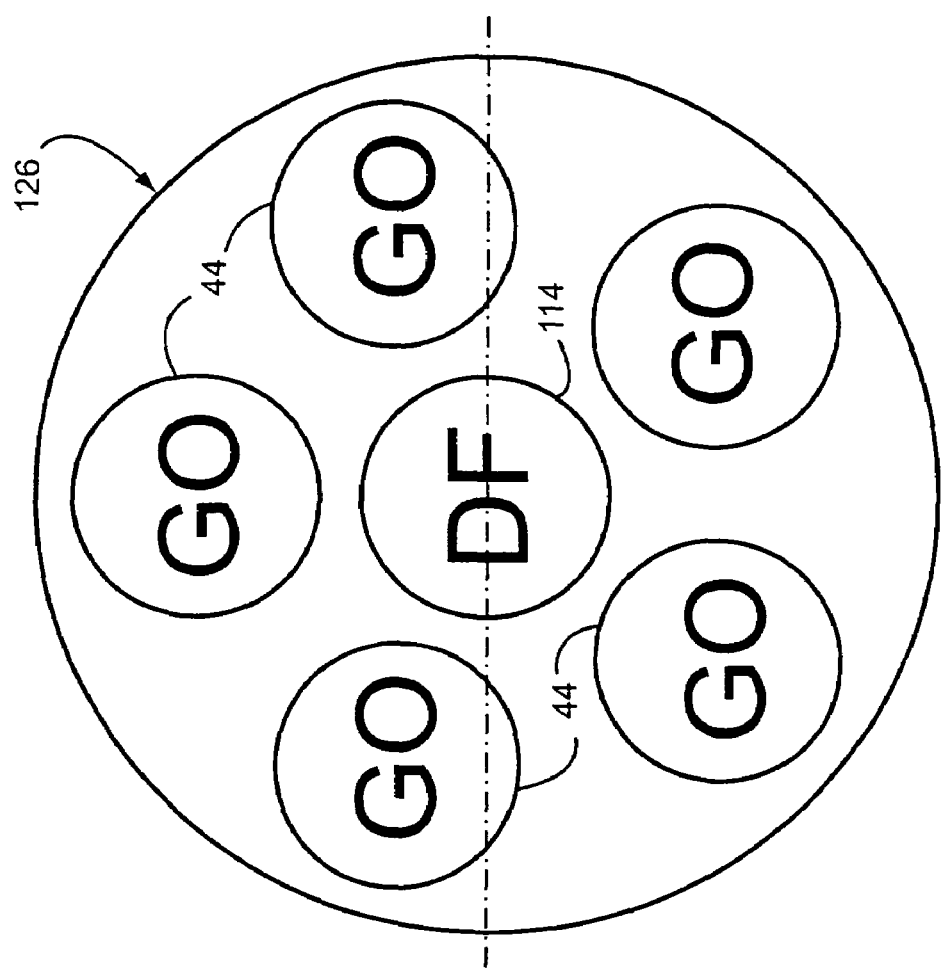
FIG. 5 is a schematic diagram of a "can-annular" array of combustors in accordance with an exemplary embodiment of the invention.

Utilizing the gas-only nozzle configuration shown in FIG. 2, and the modified dual-fuel nozzle shown in FIG. 4, a preferred arrangement of nozzles in a combustor 126 is shown in FIG. 5. Specifically, the center nozzle may be a dual-fuel nozzle 114 as shown in FIG. 4, while the five outer nozzles 44 may be gas-only nozzles 44 as shown in FIG. 2.

The invention is not limited, however, to the arrangement shown in FIG. 5. The number of outer nozzles may vary from three to more than five.

With the above simplified multi-nozzle dual-fuel can combustor with a center nozzle 114 surrounded by outer nozzles 44, the operational fueling modes are also simplified to include: (1) a diffusion mode where only the outer nozzles 44 are fueled; (2) a piloted premix mode in which the outer nozzles 44 are supplied with diffusion gas and all nozzles 44 and 114 are supplied with premix gas; (3) a premix mode in which all nozzles 44 and 114 are supplied with premix gas; (4) a liquid fuel mode in which only the center nozzle 114 is supplied with liquid fuel.

Mode transfers between gas and liquid fuel are also simplified in that diffusion gas and liquid fuel would not coexist in the same nozzle.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A combustor for a gas turbine comprising a combustion chamber and a plurality of radially outer nozzles surrounding a single, center dual-fuel nozzle, said radially outer nozzles configured to supply only gas fuel to the combustion chamber and said center nozzle configured to supply both gas and liquid fuel to the combustion chamber, wherein liquid fuel is supplied to the combustion chamber only through said center nozzle.

2. The combustor of claim 1 wherein said plurality of radially outer nozzles comprises five radially outer nozzles at substantially seventy-two degree intervals.

3. The combustor of claim 1 wherein each gas-only radially outer nozzle is formed with passages adapted to supply only diffusion gas and premix gas to the combustion chamber.

4. The combustor of claim 1 wherein said center dual-fuel nozzle is formed with at least one premix gas passage, a liquid fuel passage, an atomizing air passage, an NOx water passage and a curtain air passage.

5. The combustor of claim 3 wherein said center dual-fuel nozzle is formed with passages adapted to supply premix gas fuel and diffusion liquid fuel to the combustion chamber.

6. The combustor of claim 3 wherein said center dual-fuel nozzle is formed with at least one premix gas passage, a liquid fuel passage, an atomizing air passage, and an NOx water passage.

7. The combustor of claim 3 wherein said center dual-fuel nozzle is formed with at least one premix gas passage, a liquid fuel passage, an atomizing air passage, an NOx water passage and a curtain air passage.

8. A combustor for a gas turbine comprising a plurality of gas-only radially outer nozzles surrounding a single, dual-fuel center nozzle; wherein each gas-only radially outer nozzle is formed with passages adapted to supply only diffusion gas and premix gas; wherein said center dual-fuel nozzle is formed with passages adapted to supply premix gas fuel and diffusion liquid fuel to the combustion chamber; and further wherein liquid fuel is supplied to the combustion chamber only through said center nozzle.

9. A method of operating low NOx combustors in a gas turbine wherein the combustors each include a plurality of radially outer nozzles surrounding a single center nozzle wherein only the center nozzle is configured to supply liquid fuel to respective combustors comprising:

operating the combustors in a first diffusion mode where only the radially outer nozzles are fueled; operating the combustors in a second piloted premix mode where the radially outer nozzles are supplied with diffusion gas and the radially outer nozzle(s) and the center nozzle are supplied with premix gas; operating the combustors in a third premix mode where the radially outer nozzles and the center nozzle are supplied with premix gas; and operating the combustors in a fourth liquid fuel mode where the center nozzle is supplied with liquid fuel.

* * * * *